United States Patent
Watanabe et al.

(10) Patent No.: US 10,464,421 B2
(45) Date of Patent: Nov. 5, 2019

(54) VEHICULAR DISPLAY DEVICE AND VEHICULAR DISPLAY METHOD

(71) Applicant: NISSAN MOTOR CO., LTD., Kanagawa (JP)

(72) Inventors: Hiroshi Watanabe, Kanagawa (JP); Masayuki Shishido, Kanagawa (JP); Norio Kosaka, Kanagawa (JP); Kenji Maruyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 80 days.

(21) Appl. No.: 15/761,027

(22) PCT Filed: Sep. 18, 2015

(86) PCT No.: PCT/JP2015/076648
§ 371 (c)(1),
(2) Date: Mar. 16, 2018

(87) PCT Pub. No.: WO2017/046938
PCT Pub. Date: Mar. 23, 2017

(65) Prior Publication Data
US 2018/0257489 A1    Sep. 13, 2018

(51) Int. Cl.
G08B 5/00    (2006.01)
B60K 37/02   (2006.01)
B60K 35/00   (2006.01)
B60W 30/165  (2012.01)
G02B 27/01   (2006.01)
B60W 50/14   (2012.01)

(52) U.S. Cl.
CPC .............. *B60K 37/02* (2013.01); *B60K 35/00* (2013.01); *B60W 30/165* (2013.01);
(Continued)

(58) Field of Classification Search
CPC .......... B60W 30/165; B60W 2050/146; G02B 27/01; G02B 2027/0183;
(Continued)

(56) References Cited

U.S. PATENT DOCUMENTS 6,032,097 A * 2/2000 Iihoshi .................. G05D 1/0293
                                                        701/96
7,366,325 B2 * 4/2008 Fujimura ........... G06K 9/00369
                                                        382/104
(Continued)

FOREIGN PATENT DOCUMENTS

JP    H8-094756 A    4/1996
JP    2002-46501 A   2/2002
(Continued)

*Primary Examiner* — Toan C To
(74) *Attorney, Agent, or Firm* — Osha Liang LLP

(57) ABSTRACT

A vehicular display device, in execution of following cruise control with a preceding vehicle ahead of a host vehicle, causes a fixed indication to light up and displays a following mark in a superimposed manner with a following-target preceding vehicle. The fixed indication indicates that the following-target preceding vehicle has been detected. The vehicular display device includes a preceding vehicle detector that detects the following-target preceding vehicle, a display setter that sets the fixed indication to light up and sets the following mark to be displayed in a superimposed manner with the following-target preceding vehicle when the following-target preceding vehicle has been detected by the preceding vehicle detector, and a head-up display that displays images of the fixed indication and the following mark set by the display setter in a display region provided to be superimposed on a position of a windshield of the host vehicle.

3 Claims, 4 Drawing Sheets

(52) U.S. Cl.
CPC ...... *G02B 27/01* (2013.01); *B60K 2370/1529* (2019.05); *B60K 2370/177* (2019.05); *B60K 2370/179* (2019.05); *B60K 2370/194* (2019.05); *B60K 2370/31* (2019.05); *B60K 2370/334* (2019.05); *B60W 2050/146* (2013.01); *G02B 2027/0138* (2013.01); *G02B 2027/0183* (2013.01)

(58) Field of Classification Search
CPC ............ G02B 2027/0138; B60K 35/00; B60K 37/02; B60K 2370/177; B60K 2370/179; B60K 2370/334; B60K 2370/31; B60K 2370/194; B60K 2370/1529
USPC ................................ 180/90; 340/425.5, 815.4
See application file for complete search history.

(56) References Cited

U.S. PATENT DOCUMENTS

| | | | |
|---|---|---|---|
| 8,392,065 B2* | 3/2013 | Tolstedt | G05D 1/0214 701/41 |
| 10,185,152 B2* | 1/2019 | Yamamura | H04N 13/366 |
| 2003/0122930 A1* | 7/2003 | Schofield | B60R 1/00 348/148 |
| 2003/0128436 A1* | 7/2003 | Ishii | G02B 27/01 359/630 |
| 2004/0193331 A1* | 9/2004 | Kashiwada | G02B 27/01 701/1 |
| 2007/0106475 A1* | 5/2007 | Kondoh | B60K 26/021 701/301 |
| 2016/0147073 A1 | 5/2016 | Onda et al. | |
| 2017/0132481 A1* | 5/2017 | Sato | G06K 9/52 |
| 2017/0132922 A1* | 5/2017 | Gupta | G08G 1/0962 |
| 2017/0349175 A1* | 12/2017 | Brandin | B60Q 1/34 |
| 2019/0071077 A1* | 3/2019 | Miyamoto | B60W 30/095 |
| 2019/0217872 A1* | 7/2019 | Sasaki | B60W 50/14 |

FOREIGN PATENT DOCUMENTS

| | | |
|---|---|---|
| JP | 2004-50980 A | 2/2004 |
| JP | 2005-67514 A | 3/2005 |
| JP | 2009-298322 A | 12/2009 |
| WO | 2014/208081 A1 | 12/2014 |

* cited by examiner

VEHICULAR DISPLAY DEVICE AND VEHICULAR DISPLAY METHOD

BACKGROUND

Technical Field

The present invention relates to a vehicular display device and a vehicular display method which, in execution of following cruise control with a preceding vehicle ahead of a host vehicle, causes a fixed indication to light up and displays a following mark in a superimposed manner with a following-target preceding vehicle, the fixed indication indicating that the following-target preceding vehicle has been detected.

Related Art

Patent Literature 1 has been disclosed as a conventional vehicular display device to be used for autocruise control that enables a host vehicle to travel while following a preceding vehicle ahead. In this vehicular display device disclosed in Patent Literature 1, a following mark is displayed in a superimposed manner with a following-target preceding vehicle by using a head-up display.

Patent Literature 1: Japanese Patent Application Publication No. 2005-67514

SUMMARY OF INVENTION

In the above-mentioned conventional vehicular display device, the following mark remains displayed at all times for the same following-target preceding vehicle while the preceding vehicle is detected, and therefore annoys the driver.

One or more embodiments of the present invention provides a vehicular display device and a vehicular display method capable of reducing annoyance for the driver during following travel.

A vehicular display device and a vehicular display method according to one or more embodiments of the present invention, sets a fixed indication to light up and set a following mark to be displayed in a superimposed manner with a following-target preceding vehicle when the following-target preceding vehicle has been detected, the fixed indication indicating that the following-target preceding vehicle has been detected. Then, the device and method display images of the fixed indication and the following mark in a display region provided to be superimposed on the position of the windshield of the host vehicle, and turn off the following mark with the fixed indication kept lighting up when a predetermined period of time elapses from the start of the display of the following mark.

According to one or more embodiments of the present invention, the following mark does not remain turned on, thereby making it possible to reduce annoyance for the driver during the following travel.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration of Vehicular Display Device]

Figure 1:
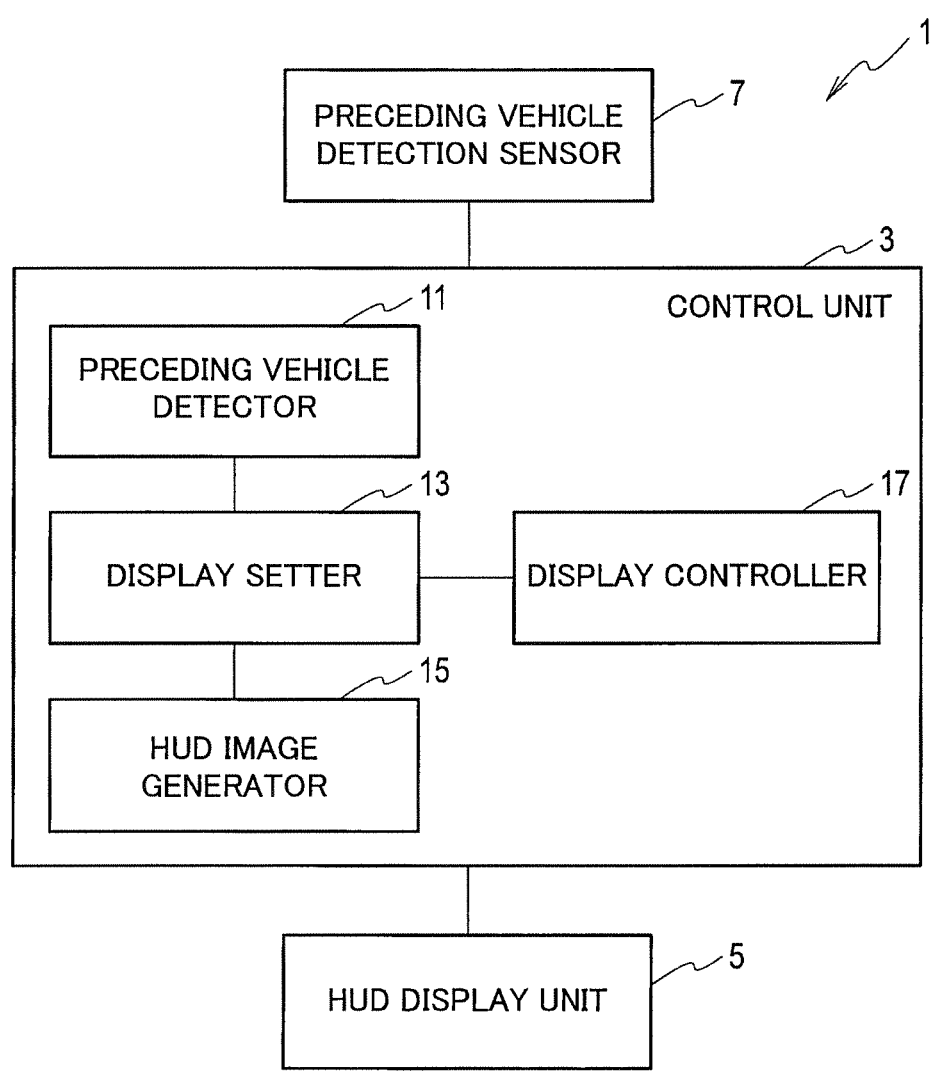
FIG. 1 is a block diagram illustrating the configuration of a vehicular display device according to one or more embodiments of the present invention.

FIG. 1 is a block diagram illustrating the configuration of a vehicular display device according to one or more embodiments of the present invention. As illustrated in FIG. 1, a vehicular display device 1 according to one or more embodiments of the present invention includes a control unit 3 and an HUD display unit 5. Also, the vehicular display device 1 is connected to a sensing instrument mounted on a vehicle and connected in particular to a preceding vehicle detection sensor 7. The vehicular display device 1 with such a configuration is mounted on the vehicle, and the vehicle on which the vehicular display device 1 is mounted is equipped with a system that executes following cruise control, such as autocruise control or adaptive cruise control, with a preceding vehicle ahead of the host vehicle. Further, the vehicular display device 1 causes a fixed indication to light up and displays a following mark in a superimposed manner with a following-target preceding vehicle through the vehicle's windshield by using a head-up display (HUD), the fixed indication indicating that the following-target preceding vehicle has been detected.

The control unit 3 controls the display of the fixed indication and the following mark and outputs images of the fixed indication and the following mark to the HUD display unit 5. The control unit 3 includes a preceding vehicle detector 11, a display setter 13, an HUD image generator 15, and a display controller 17.

The preceding vehicle detector 11 detects a following-target preceding vehicle traveling ahead of the host vehicle. Specifically, the preceding vehicle detector 11 acquires preceding-vehicle information from the preceding vehicle detection sensor 7 and detects a following-target preceding vehicle from an image of the space ahead of the host vehicle, the result of measurement by a radar, or the like contained in the preceding-vehicle information.

When the preceding vehicle detector 11 detects a following-target preceding vehicle, the display setter 13 sets the fixed indication to light up and sets the following mark to be displayed in a superimposed manner with a following-target preceding vehicle, the fixed indication indicating that the following-target preceding vehicle has been detected. The display setter 13 sets the display position, display size, luminance, and so on of the following mark in accordance with the position, size, and so on of the detected preceding vehicle. On the other hand, as for the fixed indication, the display setter 13 sets the fixed indication to start lighting up since its display position and display size have been set in advance. Here, the fixed indication is an icon to be displayed when a following-target preceding vehicle has been detected, and continues to be displayed while the following-target preceding vehicle is detected. The following mark is a display mark to highlight a following-target preceding vehicle, and is displayed in a superimposed manner around the preceding vehicle, for example, by the lower side of the preceding vehicle.

The HUD image generator 15 generates a head-up display image for displaying the fixed indication and the following mark in accordance with the settings determined by the display setter 13.

The display controller 17 performs control such that the following mark is turned off with the fixed indication kept lighting up when a predetermined period of time elapses from the start of the display of the following mark by the HUD display unit 5. Note that the predetermined period of time for which the following mark is turned on is set to such a period of time that the continuous display of the following mark does not annoy the driver, and may be set in advance based on tests or simulations.

Note that the control unit 3 is constituted of general-purpose electronic circuitry including a microcomputer, a microprocessor, or a CPU, and peripheral devices such as a memory. Moreover, by executing a particular program, the control unit 3 operates as the above-mentioned preceding vehicle detector 11, display setter 13, HUD image generator 15, and display controller 17.

The HUD display unit 5 is a head-up display including a projector that projects images, a screen and Fresnel mirror that reflect the images, and so on. Moreover, the HUD display unit 5 displays images of the fixed indication and the following mark in a display region provided to be superimposed on the position of the windshield of the vehicle. In particular, the HUD display unit 5 is a head-up display capable of displaying an image over the forward view from the vehicle in the superimposed manner by projecting an image reflected by the mirror as a virtual image behind the windshield. The HUD display unit 5, however, is not limited to such type of head-up display. For example, the HUD display unit 5 may be of a combiner type that uses a transparent panel to display images instead of displaying them on the windshield, or of a type that displays images directly on the windshield. In other words, the head-up display in one or more embodiments of the present invention may just need to be capable of displaying information over the view which the driver visually recognizes through the windshield without looking down. Note that the HUD display unit 5 corresponds to the display unit in one or more embodiments of the present invention.

The preceding vehicle detection sensor 7 is a sensor such as a forward camera or a millimeter-wave radar for detecting a preceding vehicle, and outputs preceding-vehicle information containing an image captured by the forward camera or the result of measurement by the millimeter-wave radar. Also, the preceding vehicle detection sensor 7 may include an infrared sensor, an inter-vehicle distance sensor, or the like besides the forward camera or the millimeter-wave camera.

[Procedure for Process of Controlling Display of Fixed Indication and Following Mark]

Next, a procedure for a process of controlling the display of the fixed indication and the following mark by the vehicular display device 1 according to one or more embodiments of the present invention will be described with reference to a flowchart in FIG. 2.

Figure 2:
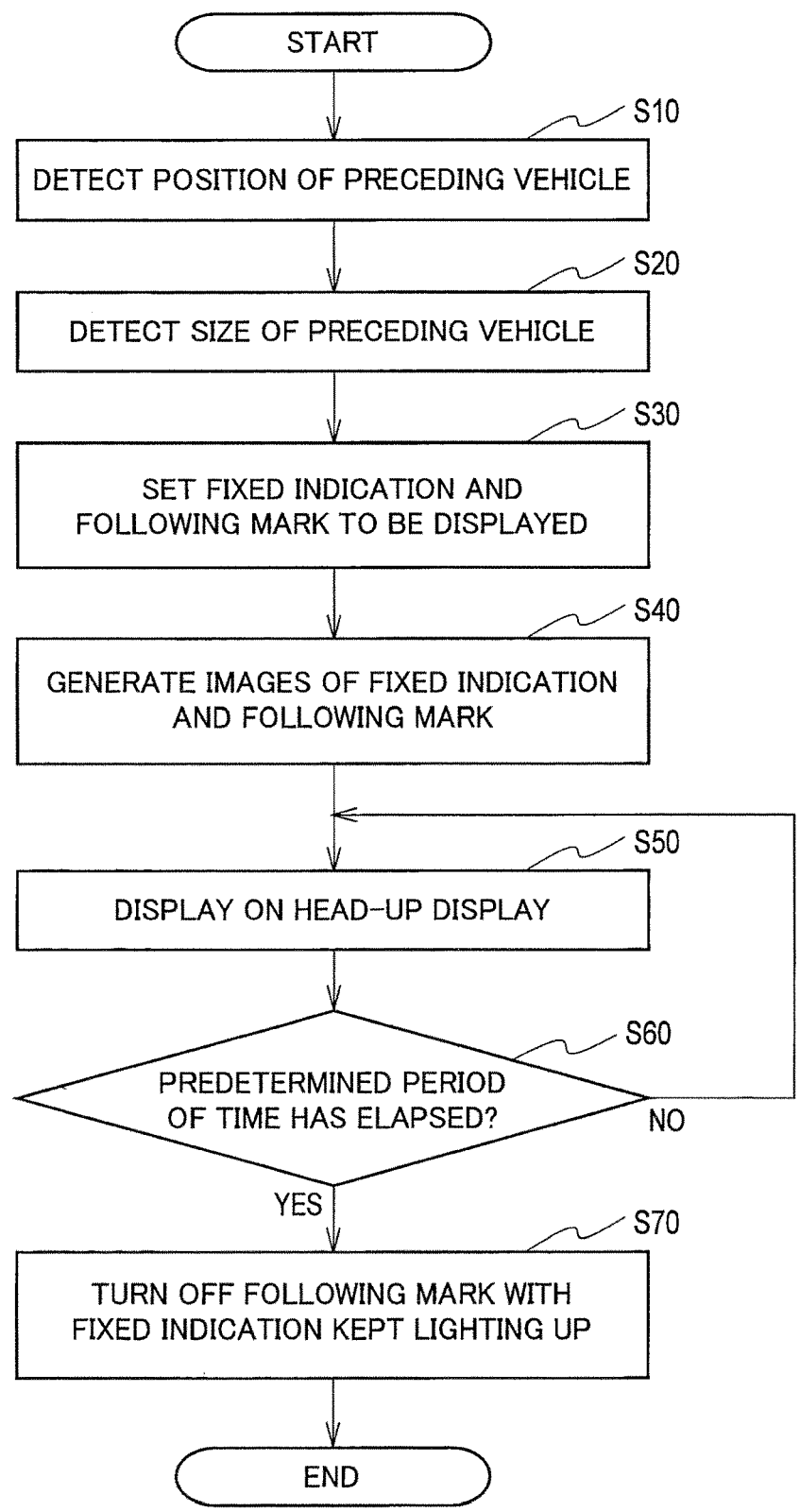
FIG. 2 is a flowchart illustrating a procedure for a process of controlling display of a fixed indication and a following mark by the vehicular display device according to one or more embodiments of the present invention.

As illustrated in FIG. 2, first in step S10, the preceding vehicle detector 11 detects a preceding vehicle traveling ahead of the host vehicle by acquiring an image captured by the forward camera or the result of measurement by the radar from the preceding vehicle detection sensor 7 and analyzing the image captured by the forward camera. Further, the preceding vehicle detector 11 detects the position of the detected preceding vehicle by acquiring three-dimensional coordinates indicating the position of the preceding vehicle.

In step S20, the preceding vehicle detector 11 detects the size of the preceding vehicle by analyzing the image captured by the forward camera.

Figure 3:
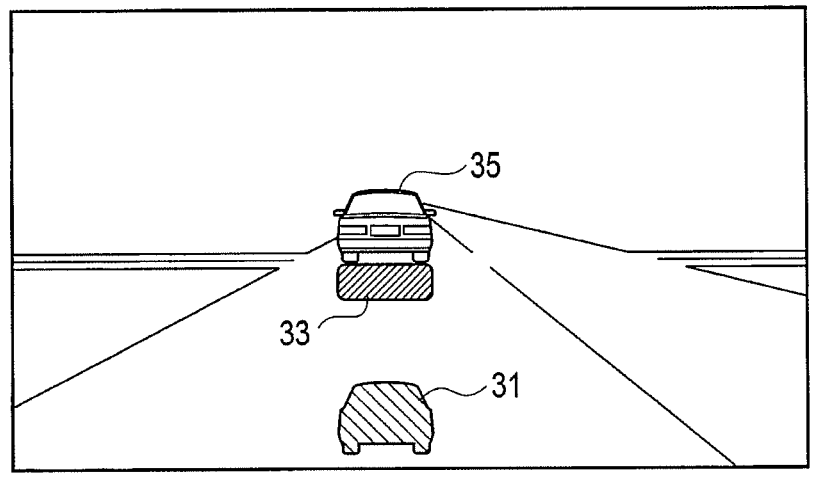
FIG. 3 is a diagram illustrating an example of the display of the fixed indication and the following mark by the vehicular display device according to one or more embodiments of the present invention.

In step S30, when the following-target preceding vehicle is detected, the display setter 13 first sets the fixed indication to light up. As illustrated in FIG. 3, a fixed indication 31 is an icon to be displayed on a lower area in the driver's view; it starts to be displayed upon detection of the following-target preceding vehicle and continues to be displayed while the following-target preceding vehicle is detected. As for the fixed indication, the display setter 13 sets the fixed indication to start lighting up since its display position and display size have been set in advance.

Then, the display setter 13 sets the following mark to be displayed in a superimposed manner with the following-target preceding vehicle. As illustrated in FIG. 3, a following mark 33 is a display mark to highlight a following-target preceding vehicle 35, and is displayed in a superimposed manner around the preceding vehicle, for example, by the lower side of the preceding vehicle.

The display setter 13 sets a rectangular frame surrounding the preceding vehicle in the image captured by the forward camera, and sets a base point at the center of this frame. The display setter 13 then sets the display position of the following mark at a position situated away from this base point downward by a predetermined distance. The display setter 13 then sets the display size of the following mark in accordance with the size of the preceding vehicle in the image. Once the display position and display size of the following mark are thus set, the following mark 33 is displayed in a superimposed manner by the preceding vehicle 35, as illustrated in FIG. 3. Note that although the following mark 33 is in a rectangular or bar shape in FIG. 3, the following mark 33 may be a rectangular frame surrounding the preceding vehicle or in a different shape such as a triangular, star, or arrow shape. Also, the following mark 33 may be displayed with predetermined values of luminance, spatial frequency, and the like that have been set in advance.

Figure 4:
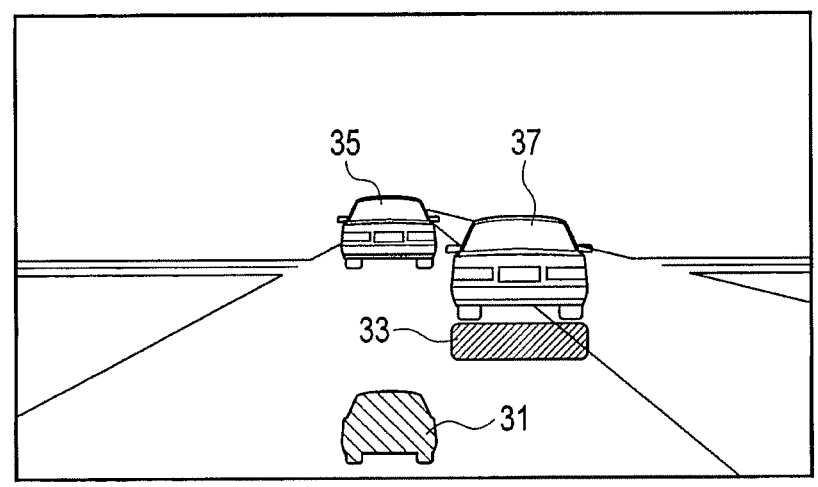
FIG. 4 is a diagram illustrating an example of the display of the fixed indication and the following mark by the vehicular display device according to one or more embodiments of the present invention.

Further, if the following-target preceding vehicle is changed, the display setter 13 sets the following mark to be displayed in a superimposed manner with the changed preceding vehicle. For example, as illustrated in FIG. 4, when another vehicle cuts in front of the host vehicle, the following-target preceding vehicle for the host vehicle is changed from the preceding vehicle 35 to a preceding vehicle 37. Then, the display setter 13 sets the following mark 33 to be displayed in a superimposed manner with the changed preceding vehicle 37.

In step S40, the HUD image generator 15 generates images of the fixed indication and the following mark set in step S30 within a three-dimensional space of the vehicle and outputs them to the HUD display unit 5.

In step S50, the HUD display unit 5 displays the images of the fixed indication and the following mark set within the three-dimensional space of the vehicle in the display region provided to be superimposed on the position of the windshield. As a result, as illustrated in FIG. 3, the image of the fixed indication 31 is displayed on a lower area in the driver's view, and the image of the following mark 33 is displayed in a superimposed manner with the preceding vehicle 35. Hence, the driver visually recognizes the fixed indication 31 and the following mark 33 behind the windshield.

In step S60, the display controller 17 determines whether or not a predetermined period of time has elapsed from the start of the display of the following mark. If the predetermined period of time has not yet elapsed, the process returns to step S50 to continue displaying the fixed indication and the following mark. On the other hand, if the predetermined period of time has elapsed from the start of the display of the following mark, the process proceeds to step S70.

Figure 5:
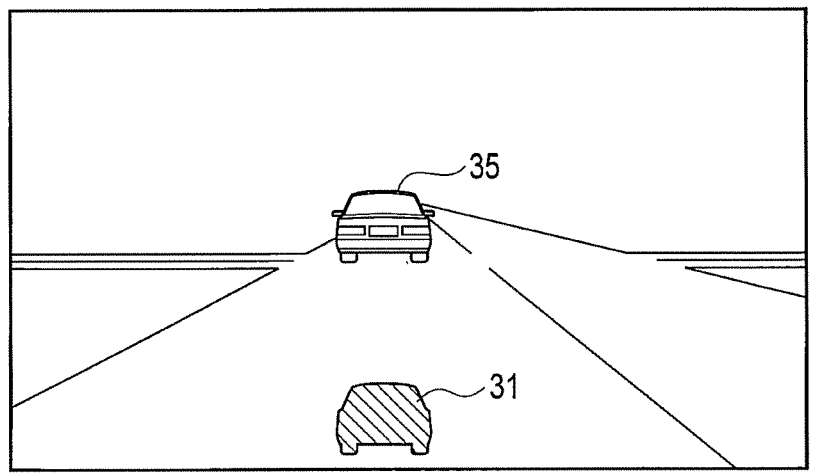
FIG. 5 is a diagram for explaining a method of controlling the display of the fixed indication and the following mark by the vehicular display device according to one or more embodiments of the present invention.
Figure 6:
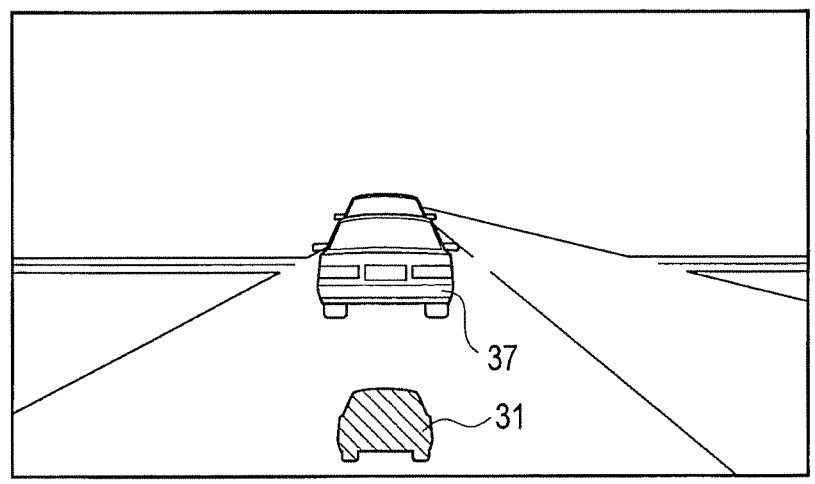
FIG. 6 is a diagram for explaining the method of controlling the display of the fixed indication and the following mark by the vehicular display device according to one or more embodiments of the present invention.

In step S70, the display controller 17 turns off the following mark with the fixed indication kept lighting up. For example, the display controller 17 turns off the following mark with the fixed indication 31 kept lighting up as illustrated in FIG. 5. Similarly, if a vehicle cuts in front of the host vehicle and the following-target preceding vehicle is changed, the display controller 17 also turns off the following mark with the fixed indication 31 kept lighting up as illustrated in FIG. 6. In this way, it is possible to reduce annoyance for the driver due to continuous display of the following mark. Meanwhile, when the following mark turned off, the driver may become anxious about whether the following cruise control is functioning. To address this, in one or more embodiments of the present invention, the fixed indication is kept lighting up to indicate to the driver that the host vehicle is following the preceding vehicle. In this way, it is possible to reduce the driver's anxiety and provide the driver with a sense of safety.

Incidentally, the display controller 17 may emphatically display the fixed indication when turning off the following mark. For example, the display controller 17 may emphatically display the fixed indication by increasing the luminance of the fixed indication, increasing its size, or changing its color when turning off the following mark. Alternatively, the display controller 17 may cause the fixed indication to flash. In this way, the display controller 17 can indicate more strongly to the driver that the host vehicle is following the preceding vehicle, and can therefore provide the driver with a greater sense of safety. When the following mark is turned off as above, the process of controlling the display of the fixed indication and the following mark according to one or more embodiments of the present invention ends.

As described above in detail, in the vehicular display device 1 according to this one or more embodiments of the present invention, when a following-target preceding vehicle is detected, the fixed indication is caused to light up and the following mark is displayed in a superimposed manner with the following-target preceding vehicle. Then, when a predetermined period of time elapses from the start of the display of the following mark, the following mark is turned off with the fixed indication kept lighting up. In this way, the following mark does not remain turned on, thereby making it possible to reduce annoyance for the driver. Moreover, with the fixed indication kept lighting up, it is possible to indicate to the driver that the host vehicle is following the preceding vehicle, and therefore provide the driver with a sense of safety.

Further, in the vehicular display device 1 according to one or more embodiments of the present invention, if the following-target preceding vehicle is changed, the following mark is displayed in a superimposed manner with the changed preceding vehicle. In this way, in a case where another vehicle cut in front of the host vehicle or in other similar cases, it is possible to clearly indicate to the driver that the following-target preceding vehicle has been changed.

Furthermore, in the vehicular display device 1 according to one or more embodiments of the present invention, the fixed indication may be emphatically displayed when the following mark is turned off. In this way, even when the following mark turned off, it is possible to indicate more strongly to the driver that the host vehicle is following the preceding vehicle and therefore provide the driver with a greater sense of safety.

Note that the above-described embodiments are merely examples of the present invention. Therefore, the present invention is not limited to the above-described embodiments, but various changes can be made as modes other than the above embodiments in accordance with the design and so on without departing from the technical idea of the present invention, as a matter of course.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 vehicular display device
3 control unit
5 HUD display unit (display unit)
7 preceding vehicle detection sensor
11 preceding vehicle detector
13 display setter
15 HUD image generator
17 display controller

The invention claimed is:

1. A vehicular display device that, in execution of following cruise control with a preceding vehicle ahead of a host vehicle, causes a fixed indication to light up and displays a following mark in a superimposed manner with a following-target preceding vehicle, the fixed indication indicating that the following-target preceding vehicle has been detected, the vehicular display device comprising:
a preceding vehicle detector that detects the following-target preceding vehicle;
a display setter that sets the fixed indication to light up and sets the following mark to be displayed in a superimposed manner with the following-target preceding vehicle when the following-target preceding vehicle has been detected by the preceding vehicle detector;
a head-up display that displays images of the fixed indication and the following mark set by the display setter in a display region provided to be superimposed on a position of a windshield of the host vehicle; and
a display controller that turns off the following mark with the fixed indication kept lighting up when a predetermined period of time elapses from a start of the display of the following mark by the head-up display, wherein, when the following-target preceding vehicle is changed, the display setter sets the following mark to be displayed in a superimposed manner with the changed preceding vehicle.

2. The vehicular display device according to claim 1, wherein the display controller emphatically displays the fixed indication when turning off the following mark.

3. A vehicular display method performed by a vehicular display device that, in execution of following cruise control with a preceding vehicle ahead of a host vehicle, causes a fixed indication to light up and displays a following mark in a superimposed manner with a following-target preceding vehicle, the fixed indication indicating that the following-target preceding vehicle has been detected, the vehicular display method comprising:

detecting the following-target preceding vehicle;
 setter the fixed indication to light up and set the following mark to be displayed in a superimposed manner with the following-target preceding vehicle when the following-target preceding vehicle has been detected;
 displaying images of the set fixed indication and following mark in a display region provided to be superimposed on a position of a windshield of the host vehicle;
 turning off the following mark with the fixed indication kept lighting up when a predetermined period of time elapses from a start of the display of the following mark; and
 when the following-target preceding vehicle is changed, setting the following mark to be displayed in a superimposed manner with the changed preceding vehicle.

* * * * *